United States Patent
Hansen

(10) Patent No.: US 10,788,202 B2
(45) Date of Patent: Sep. 29, 2020

(54) APPARATUS FOR PRODUCTION OF STEAM FROM AN AQUEOUS LIQUID

(71) Applicant: HSL Energy Holding ApS, Ishøj (DK)

(72) Inventor: Niels Hansen, Svendborg (DK)

(73) Assignee: HSL Energy Holding Aps, Ishoj (DK)

(*) Notice: Subject to any disclaimer, the term of this patent is extended or adjusted under 35 U.S.C. 154(b) by 62 days.

(21) Appl. No.: 16/302,778

(22) PCT Filed: May 23, 2017

(86) PCT No.: PCT/DK2017/050169
§ 371 (c)(1),
(2) Date: Nov. 19, 2018

(87) PCT Pub. No.: WO2017/202432
PCT Pub. Date: Nov. 30, 2017

(65) Prior Publication Data
US 2019/0128513 A1 May 2, 2019

(30) Foreign Application Priority Data

May 23, 2016 (DK) .................................. 2016 70343

(51) Int. Cl.
*F22B 1/00* (2006.01)
*C02F 1/14* (2006.01)
*F03G 6/00* (2006.01)

(52) U.S. Cl.
CPC ................ *F22B 1/006* (2013.01); *C02F 1/14* (2013.01); *F03G 6/003* (2013.01); *Y02A 20/129* (2018.01)

(58) Field of Classification Search
CPC .......... F22B 1/006; C02F 1/14; Y02A 20/129; F03G 6/003; F03G 2006/006; F24S 80/50;
(Continued)

(56) References Cited

U.S. PATENT DOCUMENTS 4,235,679 A 11/1980 Swaidan
6,440,275 B1* 8/2002 Domen ..................... C02F 1/14
202/234
(Continued)

FOREIGN PATENT DOCUMENTS

CN 101767841 A 7/2010
CN 201634461 U 11/2010
(Continued)

OTHER PUBLICATIONS

First Office Action with Search Report issued for Danish Patent Application No. PA201670343, dated Dec. 22, 2016, 5 pages.
(Continued)

*Primary Examiner* — Mark A Laurenzi
*Assistant Examiner* — Xiaoting Hu
(74) *Attorney, Agent, or Firm* — Ziegler IP Law Group, LLC

(57) ABSTRACT

An apparatus for production of steam from an aqueous liquid includes (a) a solar panel with a pliable, essentially impermeable, polymer membrane having an outer surface and an inner surface, wherein the outer surface is adapted to be directed towards the sun; a lattice structure adapted to support the inner surface of the polymer membrane; a backing, which together with the pliable polymer film, encases the lattice structure; an inlet for the aqueous liquid; an outlet for the steam produced, and (b) means for providing a vacuum connected to the outlet. The apparatus can be produced with few and relatively simple components thereby reducing the cost of the apparatus.

9 Claims, 6 Drawing Sheets

(58) Field of Classification Search
CPC .......... F24S 80/52; F24S 80/525; F24S 80/54; F24S 20/80; F24S 2025/011; F24S 2080/05; F24S 2080/09; F24S 10/25; F24S 10/40; F24S 10/45; F24S 10/506
See application file for complete search history.

(56) References Cited

U.S. PATENT DOCUMENTS

| | | | |
|---|---|---|---|
| 7,340,845 B2* | 3/2008 | Kneebone | B01D 1/30 34/60 |
| 2004/0060808 A1* | 4/2004 | LaViolette | F24S 10/25 202/234 |
| 2007/0137639 A1 | 6/2007 | Rhodes | |
| 2015/0166371 A1 | 6/2015 | Escher et al. | |

FOREIGN PATENT DOCUMENTS

| | | | |
|---|---|---|---|
| ES | 2110913 A1 * | 2/1998 | |
| GB | 2126705 A | 3/1984 | |
| GB | 2528975 A | 2/2016 | |
| JP | S56-115601 A | 9/1981 | |
| JP | 2000-279944 A | 10/2000 | |
| WO | 2014/160384 A1 | 10/2014 | |

OTHER PUBLICATIONS

International Preliminary Report on Patentability received for International Patent Application No. PCT/DK2017/050169, dated Nov. 27, 2018, 6 pages.

International Search Report, Application No. DK/2017/050169, dated Oct. 9, 2017, 2 pages.

* cited by examiner

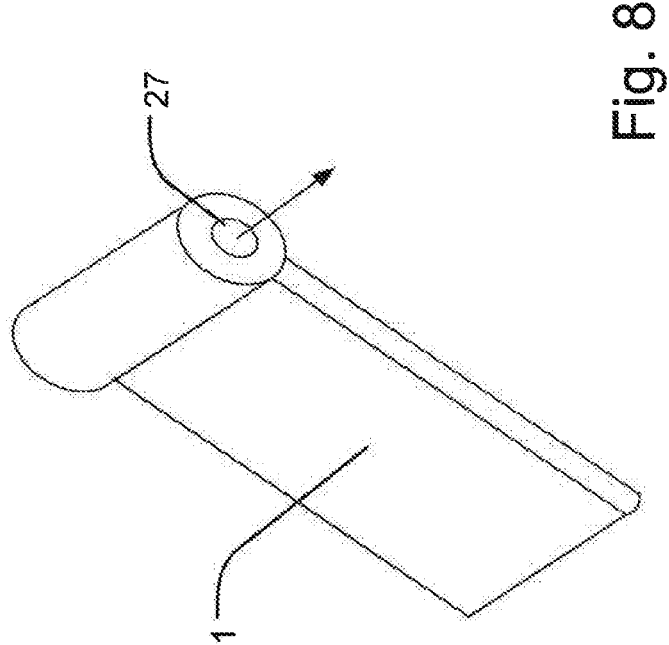

APPARATUS FOR PRODUCTION OF STEAM FROM AN AQUEOUS LIQUID

INTRODUCTION

The aspects of the disclosed embodiments relate to an apparatus for production of steam from an aqueous liquid, said apparatus comprising a solar panel and means for providing a vacuum. The apparatus may be produced with low costs due to few, relative cheap and non-complex components and their assembly. The apparatus of the invention is particular adapted for desalination of sea water. However, the apparatus may be applied to any aqueous liquid source such as process water from industry, cooling water from power plant, or waste water, such as waste water comprising heavy metals.

BACKGROUND ART

GB2528975 discloses a desalination and underground irrigation system. The desalination system comprises an evaporation chamber, a basin for water and a covering canopy. I the evaporation chamber vapor evaporates from the basin containing water and the vapor is condensated on the canopy in a plurality of condensate channels formed on the inner surface of the canopy. According to the prior art document, the condensate may be used in an underground irrigation system.

US 2007/0137639 A1 relates to a solar collector formed by relatively thin polymer sheets. The sheets are welded together to define a plurality of fluid flow channels. The solar collector is arranged such that the sun heats a working fluid, which subsequently delivers energy to a target liquid, such as water. The prior art disclosure does not disclose a lattice structure between the polymer sheets and the working fluid is not necessarily evaporated and subsequently condensed.

While the prior art provides apparatuses that relatively cheap can collect the energy from the sun and accumulate the energy in water, there is still a need for an apparatus which can be produced with few and relatively simple components thereby reducing the cost of the apparatus.

SUMMARY

The aspects of the disclosed embodiments relate to an apparatus for production of steam from an aqueous liquid, comprising a solar panel comprising, (i) a pliable, essentially impermeable, polymer membrane having an outer surface and an inner surface, wherein the outer surface is adapted to be directed towards the sun, (ii) a lattice structure adapted to support the inner surface of the polymer membrane, (iii) a backing, which together with the pliable polymer film, encases the lattice structure, (iv) an inlet for the aqueous liquid (v) an outlet for the steam produced, and means for providing a vacuum connected to the outlet.

The means for providing a vacuum provides a pressure lower than the ambient pressure, which has the dual effect of reducing the boiling temperature of the aqueous liquid and securing the surface of the polymer membrane to the lattice structure.

Many types of aqueous liquids may be used for evaporation in the present apparatus. If the water contains salts or other components which may precipitate upon concentration the solar panel further suitably comprises an outlet for the treated aqueous liquid. As the water evaporates from the aqueous liquid in the solar panel fresh aqueous liquid may be added to the inlet either bach wise or on a continuous basis to maintain the amount of water at a essential constant level.

The possibility of removing treated aqueous liquid through an outlet is particularly favorable when seawater is used as the aqueous liquid. This prevents or reduces the possibilities for the precipitation of salt crystals in the solar panel. The concentrated saline liquid may be discarded to the aqueous recipient, recirculated or further processed. When the treated aqueous liquid is further processed, the up concentrated impurities of the aqueous liquid may be recovered. Notably, crystalline salt may be recovered from a brine produced by the present disclosure.

The apparatus of the disclosed embodiments may be operated in batch or continuous mode. When operated in batch mode, the lattice structure is prefilled with the aqueous liquid before operation of the apparatus. In the continuous mode at least a part of treated aqueous liquid is mixed with fresh aqueous liquid and conveyed to the inlet. The partly returning of the treated aqueous liquid to the inlet for renewed treatment in the solar panel allows for obtaining a certain steady state of the salt concentration. A constant salt concentration will generally enable more stable operation conditions.

Furthermore, recirculation allows for liquid moment to avoid local areas of high salt concentrations and a more efficient contact with the aqueous liquid surface and the vapor.

The treated aqueous liquid that leaves the apparatus generally has a relatively high temperature compared to the temperature of the fresh aqueous liquid. Therefore, in a certain embodiment of the invention, a heat exchanger is connected to the warm treated aqueous liquid and colder fresh aqueous liquid for heat exchange between these fluids. The heat exchanger transfers heat energy from the treated aqueous liquid to the fresh aqueous liquid conveyed to the inlet, thereby improving the overall energy efficiency of the system. Furthermore, it is avoided that a cold aqueous solution provides local areas in the solar panel where salt crystals may precipitate.

To easier obtain a steady state of salt concentration, the apparatus of the present invention may further be provided with a mixing pump for mixing the fresh aqueous liquid and the treated aqueous liquid before it is introduced to the solar panel via the inlet. The application of a mixing pump provides for an accurate proportion between the treated and the fresh aqueous liquid. Alternatively, the mixing pump may be substituted by a pump and a valve for regulating the flow of the fresh and recirculated aqueous liquid. The proportion between fresh and recirculated aqueous liquid may be changed if the conditions are changed to ensure constant operation conditions for the solar panel.

The polymer membrane is suitably sealable connected to the bottom to encase the lattice structure. A sealed connection between the polymer membrane and the backing allows for an essentially air and gas tight construction, which does not allow liquid or gas/vapor communication with the ambient air, thereby ensuring a controllable internal pressure and flow conditions.

In a certain embodiment the polymer membrane and the backing are prepared of the same type of material. Use of the same material reduces the complexity of the panel and thus the costs. Furthermore, the polymer membrane may be pre-prepared with at least two sides sealable attached to each other enabling easy production of the solar panel. The polymer membrane and the backing form a stocking into which the lattice structure may be introduced during the production.

Furthermore, the pliable polymer membrane will also be attached to the lattice structure, ensuring cost effective operation and production. The polymer membrane may be produced of any suitable material, which can withstand the heat and pressure conditions. Examples includes polyethylene (PE), polypropylene (PP), polyethylene terephthalate (PETP), polyvinylchloride (PVC), polyesters, polystyrene (PS), polyacrylonitrile, polytetrafluoroethylene, poly (methyl methacrylate), poly(vinyl acetate). The polymer is suitably a single sheet of polymer having a thickness of 1 mm or less, such as 0.5 mm, 0.3 mm, 0.1 mm or less. To decrease the heat loss in the membrane a thin membrane that nevertheless is able to withstand the mechanical stress is generally preferred. The polymer sheet may be covered by a polymer material with a suitable polarity.

The lattice structure may have a number of different shapes, which support the inner surface of the polymer membrane. In a certain embodiment, the lattice comprises ribs, which are kept in a frame by longitudinal rods. The lattice structure preferably comprises flow channels for the aqueous liquid as well as the steam produced.

The flow channels allows for the liquid and the gaseous fluids to circulate in the solar panel during operation.

To increase the affectivity it is preferred to use a manifold in the upper part of the panel for distribution of the aqueous liquid in the flow channels. In this way the area of the solar panel is more efficiently used when aqueous liquid is equally distributed in all the flow channels. In embodiments where the solar panel is inclined when installed, the aqueous liquid will flow through the flow channels by the force of gravity.

SHORT DESCRIPTION OF THE DRAWINGS

In the following, exemplary embodiments of the device and the method according to the present disclosure will be described with reference to the drawings in which:

FIG. 8 shows an embodiment of the solar panel in which the vapor produced is collected in a reservoir in the upper part.

DETAILED DESCRIPTION OF THE DRAWINGS

Figure 1:
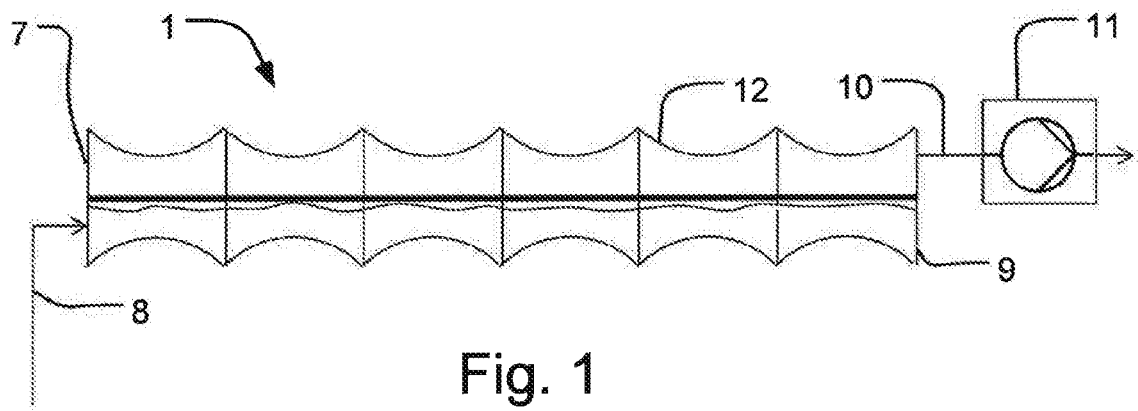
FIG. 1 shows an embodiment in which the solar panel is placed horizontally.
Figure 2:
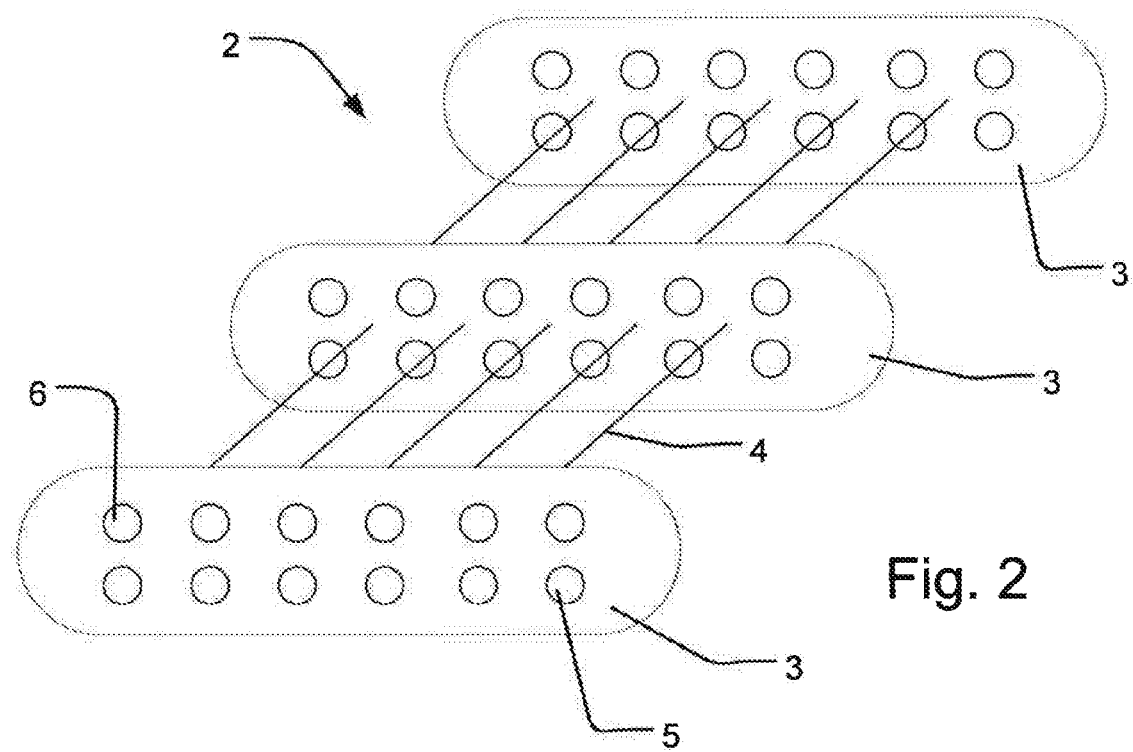
FIG. 2 depicts a frame structure with ribs and rods.

FIG. 1 depicts an embodiment of the claimed subject matter in which the solar panel 1 is placed horizontally. The basic construction is composed of a lattice 2 illustrated on FIG. 2. The lattice comprises a number of ribs 3 distanced from each other by rods 4. The ribs are provided with lower and upper apertures suitable for allowing the flow of vapor and liquid, respectively. The lattice is provided with a first end section 7 arranged with an inlet 8 for an aqueous liquid and a second end section 9 arranged with an outlet 10 for the vapor produced. Furthermore a means for producing vacuum is provided in vapor connection with the outlet. The lattice together with the first and the second end sections are covered by a pliable, essentially impermeable polymer membrane 12.

Initially, the solar panel is provided with an aqueous liquid to be distilled. As an example, the aqueous liquid can be saline seawater. When a vacuum is provided to the solar panel, the polymer membrane will be tightly secured to the ribs and the polymer membrane will be bulging inwardly. The bulging will at least in some areas, depending on the sun height, result in the sun rays being directed perpendicular to the polymer membrane, which will increase the efficiency. The means for producing a vacuum lowers the pressure inside the solar panel, which in turn will lower the boiling temperature of the aqueous liquid. As the volume of the vapor is higher than the corresponding aqueous liquid, the vapor will flow out of the solar panel. The lower apertures in the ribs will ensure the aqueous liquid to flow freely in the solar panel and the upper apertures will allow the produced vapor to be distributed in the room above the liquid surface and eventually be directed out of the outlet.

The means for producing a vacuum may at least in the initial phase of the process be a vacuum pump. However, in a certain embodiment the vacuum is produced by condensing the vapor to distilled water. The condensation may be provided by heat exchanging with a cooler liquid, like seawater. The condensation will produce a suction effect, which after a certain process time may be sufficient to provide for the vacuum pressure in the solar panel. After a certain process time, an amount of water will have evaporated from the liquid source and a new portion may be added, either batch wise or continuously.

Figure 3:
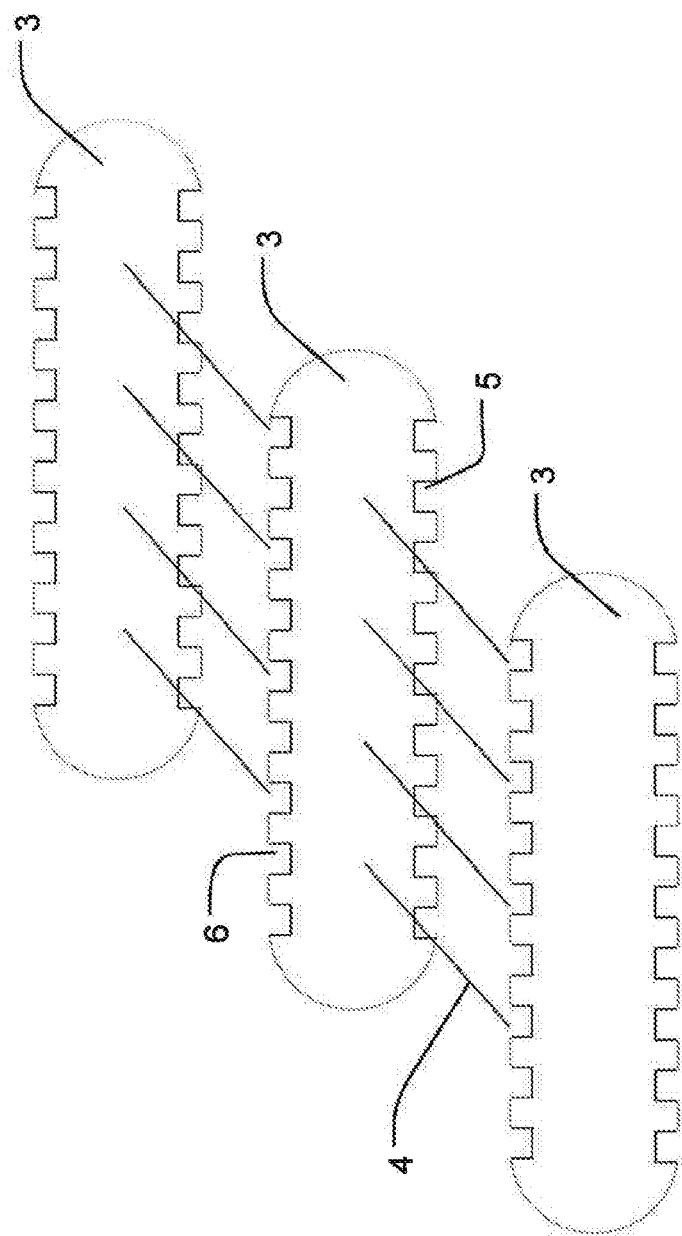
FIG. 3 shows a frame structure with ribs having flow channels.

FIG. 3 shows a frame structure with ribs having flow channels. The lower liquid flow channels 5 provide for a free flow of aqueous liquid and the upper liquid flow channels 6 provide for a free distribution and flow of the vapor produced.

Figure 4:
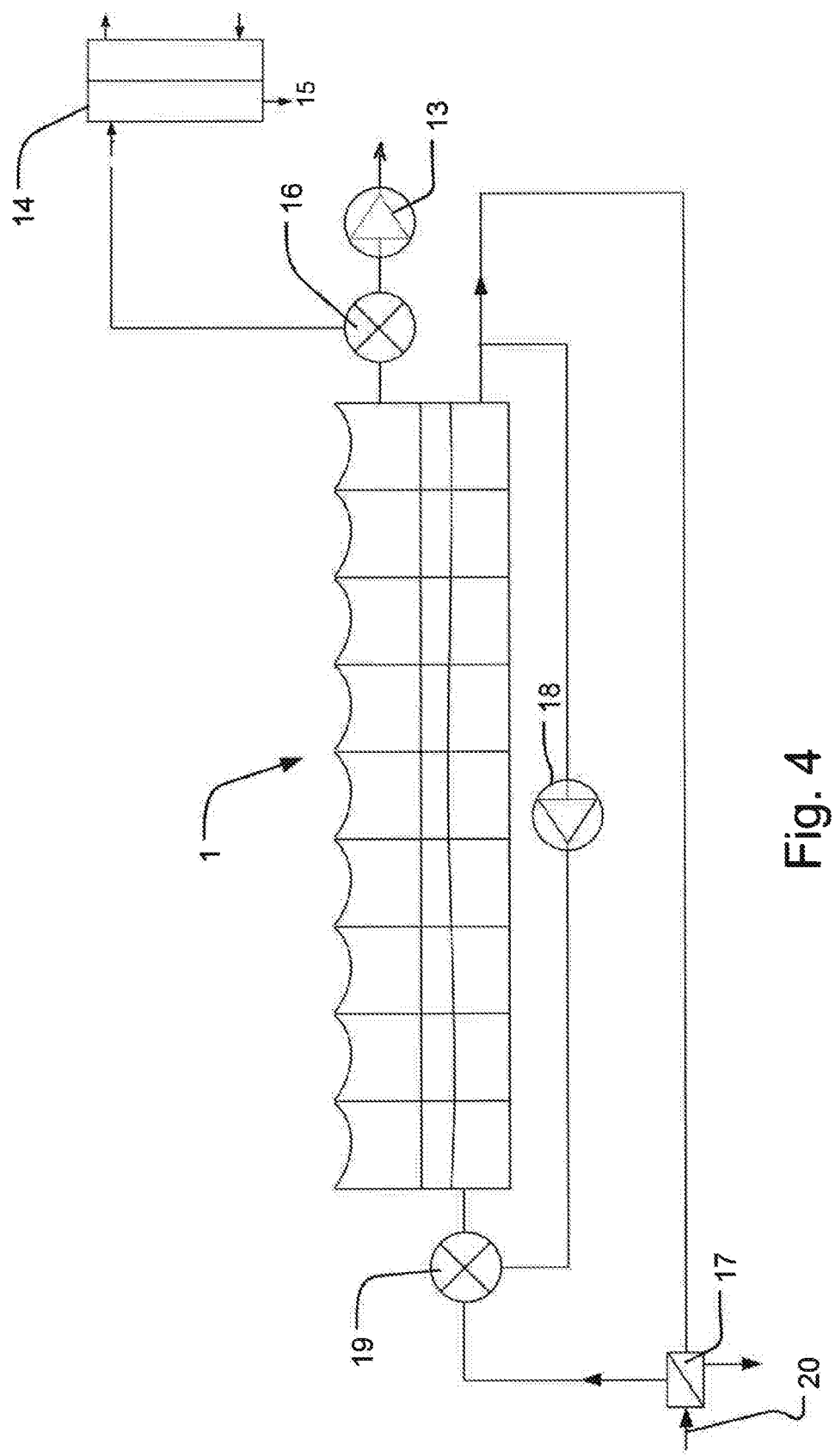
FIG. 4 shows a horizontal embodiment with process equipment attached.

FIG. 4 shows an embodiment with process equipment attached. The process equipment includes a vacuum pump 13 for providing the initial vacuum in the solar panel 1. In addition a condenser 14 is provided which will condense the vapor to obtain a distillate product 15. The condenser may be cooled with an appropriate liquid like seawater. While the vacuum pump usually is needed in the starting phase to speed up the provision of the low pressure in the solar panel, the valve 16 may later on transfer the vapor to the condenser 14. In the vapor produced in the starting phase is usually not condensed.

The process equipment further includes a heat exchanger 17, a pump 18 and a valve 19. The pump 18 recirculates a part of the aqueous liquid that has been treated in the solar panel to the inlet. The proportion of recirculated liquid and fresh aqueous liquid 20 entering the solar panel is adjusted by the valve 19. The amount of fresh aqueous liquid 20 entering the solar panel is heat exchanged with the part of the treated aqueous liquid leaving the system in the heat exchanger 17. When the system has been operated for some time a steady state will be obtained, where the concentration of impurities is maintained at a constant level in the solar panel. When seawater is used as the aqueous liquid feed, the impurities will be sodium chloride. The treated liquid may be discharged or may be further processed to recover the sodium chloride crystals.

Figure 5:
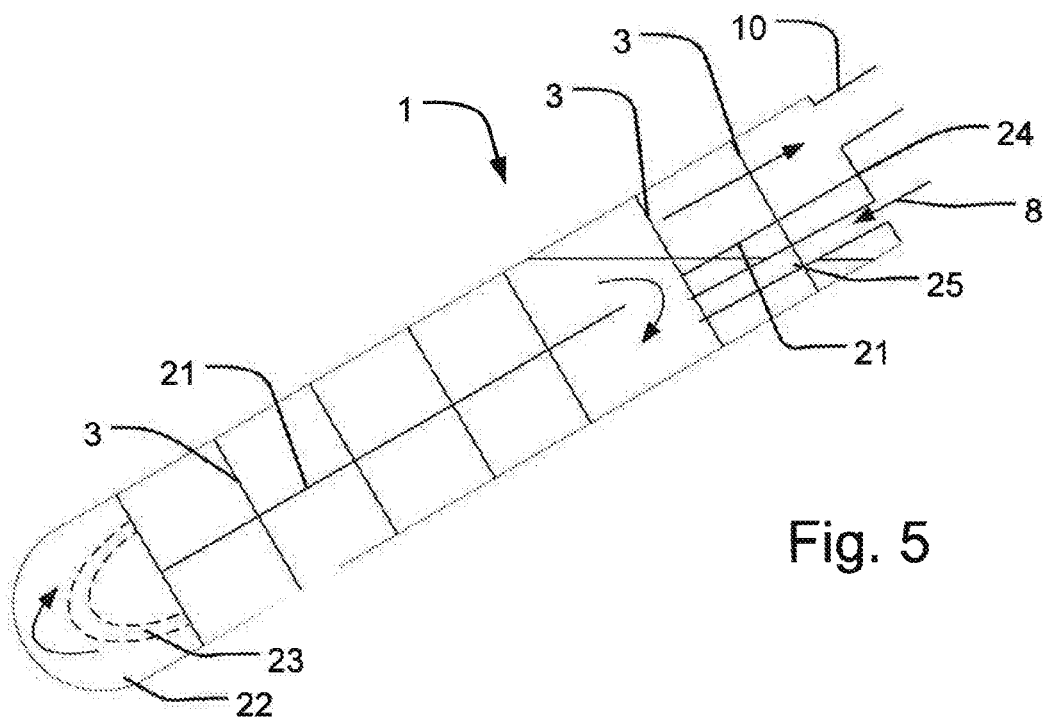
FIG. 5 depicts a cross sectional view of an embodiment of the solar panel.
Figure 6:
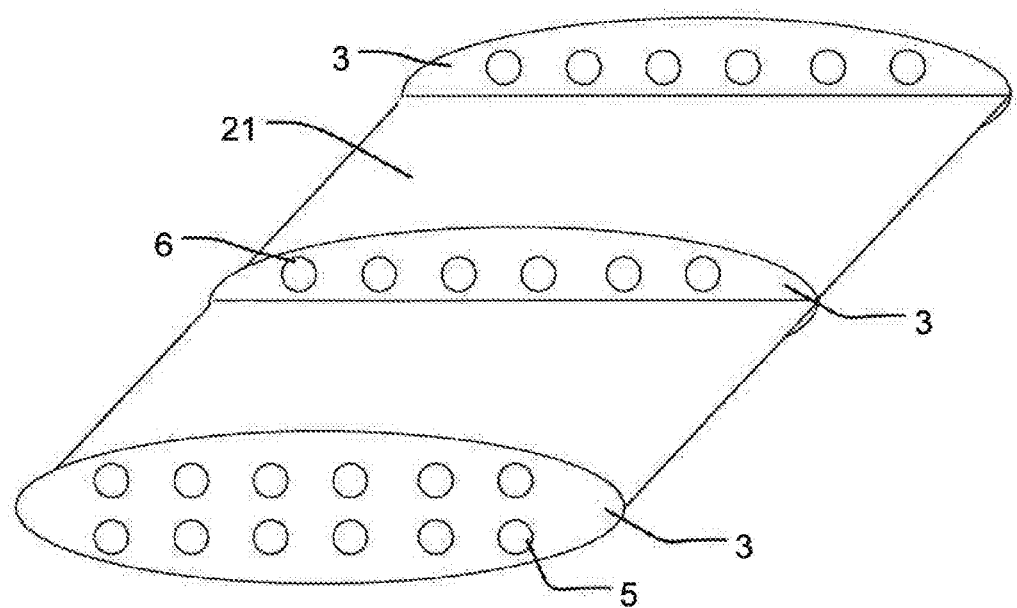
FIG. 6 shows the frame structure of embodiment shown in FIG. 5.

FIG. 5 shows a cross sectional view of an embodiment of a solar panel intended for inclined positioning and FIG. 6 shows the lattice frame used in the embodiment. The lattice includes ribs 3 distanced by plates 21. The plate 21 separates the solar panel in an upper compartment intended to be directed towards the sun and a lower compartment for transport of the cooler liquid. The ribs are provided with lower apertures 5 for transporting the cooler aqueous liquid and upper apertures for transporting the aqueous liquid being heated by the sun rays. The lattice also includes a lower end section 22 for transporting the cooler liquid from the back of the solar panel to the front side. The end section comprises channels for conveying the aqueous liquid from the lower apertures 5 on the back to the upper apertures 6 on the front side. Furthermore, the lattice includes an upper end section having an outlet for the vapor produced. Also provided is an inlet 8 for the aqueous liquid to be treated. The inlet is provided with a pipe, which extends below the surface of the aqueous liquid.

The embodiment shown in FIG. 5 and FIG. 6 is initially provided with a vacuum provided by a not shown pump connected to the outlet for the vapor 10. The relative low pressure in the solar panel will provide for a boiling of the aqueous liquid, which in turn will produce vapor. The evaporation will occur primarily in the upper layer of the liquid and on the side of the solar panel facing the sun. The evaporation will cool the aqueous liquid and the cooler aqueous liquid will be transported at the backside of the solar panel through the lower apertures and the lower end section to the front side of the solar panel. At the front side of the solar panel the aqueous liquid will be heated and thereby be raised towards the surface of the aqueous liquid. In this way a circulation is provided for inside the solar panel. Fresh aqueous liquid may be added batch wise or on a continuous basis to maintain essential the same level of the surface of the aqueous liquid.

Figure 7:
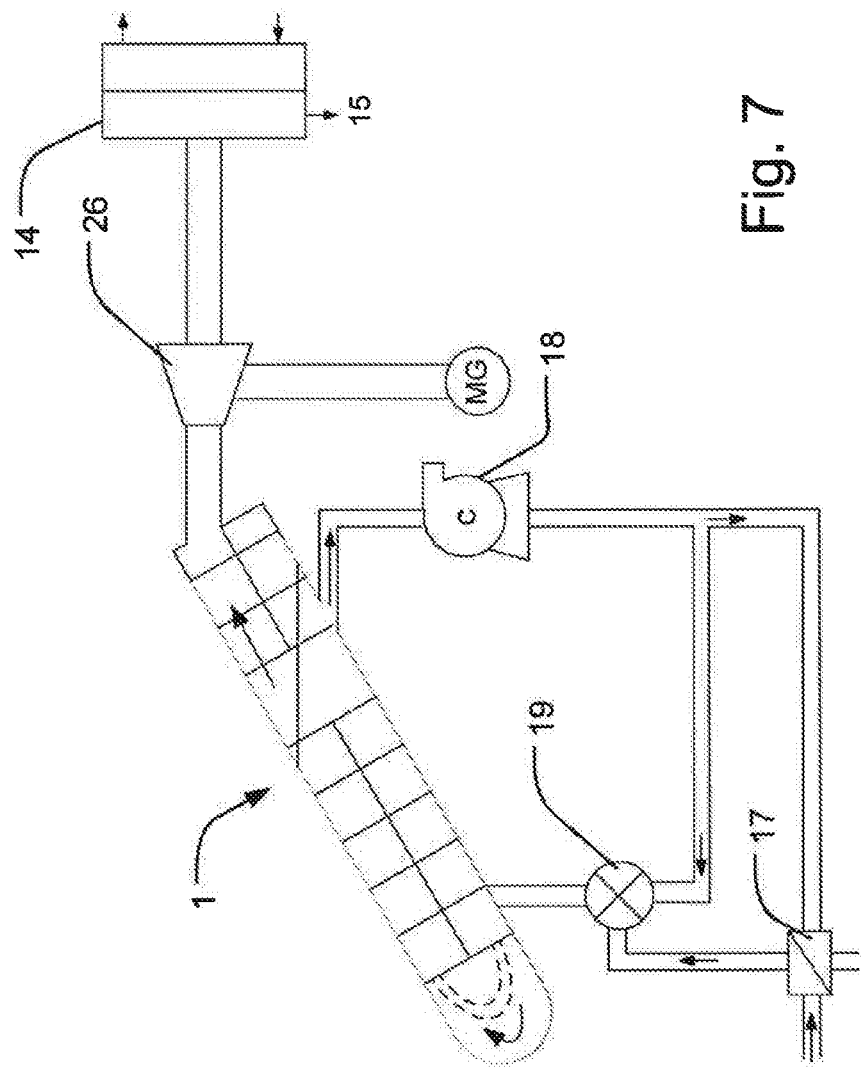
FIG. 7 shows the embodiment of FIG. 5 with attached process equipment.

FIG. 7 shows the embodiment of FIGS. 5 and 6 with in a continuous operation configuration. Furthermore, the system is provided with a combined generator and electrical motor 26. The combined generator and electrical motor 26 initially functions as a vacuum pump, which receives electrical power from the grid. After the start up phase, the pressure in the produced vapor is used to operate the generator, thereby producing electrical energy. The energy may be supplied the grid or may be used to operate the pump 18 or other kinds of equipment requiring electrical energy. Due to the energy savings the system may be operated a very low cost. As explained for the embodiment shown in FIG. 4, the vapor is condensed in the condenser 14 and the condensate is heat exchanged with the fresh aqueous liquid. The valve 19 and the pump 18 provides for an assisted circulation in the solar panel and at the same time maintains a steady state inside the solar panel.

FIG. 8 shows an embodiment of the solar panel in which the vapor produced is collected in a reservoir 27 in the upper part. When several solar panels are used together, the stream of the vapors may be collected and conveyed to the common pump means and/or condensation operation.

The invention claimed is:

1. An apparatus for production of steam from an aqueous liquid, comprising
   a. a solar panel including
      i. a pliable, essentially impermeable, polymer membrane having an outer surface and an inner surface, wherein the outer surface is adapted to be directed towards the sun,
      ii. a lattice structure adapted to support the inner surface of the polymer membrane,
      iii. a backing, which together with the pliable polymer membrane, encases the lattice structure,
      iv. an inlet for the aqueous liquid,
      v. a first outlet for the steam produced, and
   b. means for providing a vacuum connected to the first outlet.

2. The apparatus according to claim 1, wherein the solar panel further comprises a second outlet for treated aqueous liquid.

3. The apparatus according to claim 2, wherein at least a part of the treated aqueous liquid is mixed with fresh aqueous liquid and conveyed to the inlet.

4. The apparatus according to claim 2, further comprising a heat exchanger connected to cool the treated aqueous liquid and to heat fresh aqueous liquid.

5. The apparatus according to claim 3, further comprising a mixing pump for mixing the fresh aqueous liquid and the treated aqueous liquid before the mixture is introduced to the solar panel via the inlet.

6. The apparatus according to claim 1, wherein the polymer membrane is sealably connected to the backing.

7. The apparatus according to claim 1, wherein the polymer membrane and the backing are made of the same material.

8. The apparatus according to any of the claims 1 to 7, wherein the lattice structure comprises flow channels for the aqueous liquid as well as the steam produced.

9. The apparatus according to claim 8, further comprising a manifold in an upper part of the solar panel for distribution of the aqueous liquid in the flow channels.

* * * * *